United States Patent
Salmon

[11] Patent Number: 5,745,309
[45] Date of Patent: Apr. 28, 1998

[54] METHOD FOR REMOVING TILT CONTROL IN ADAPTIVE OPTICS SYSTEMS

[75] Inventor: Joseph Thaddeus Salmon, Livermore, Calif.

[73] Assignee: The United States of America as represented by the United States Department of Energy, Washington, D.C.

[21] Appl. No.: 823,706

[22] Filed: Mar. 25, 1997

Related U.S. Application Data

[63] Continuation of Ser. No. 516,505, Aug. 17, 1995, abandoned, which is a continuation of Ser. No. 258,892, Jun. 13, 1994, abandoned.

[51] Int. Cl.$^6$ .................... G02B 5/08; G02B 7/182; G01J 1/00; G01J 1/20
[52] U.S. Cl. .................... 359/846; 359/849; 359/900; 356/121; 250/201.9
[58] Field of Search ............ 359/900, 223–225, 359/846, 849, 224; 356/121; 250/201.9

[56] References Cited

U.S. PATENT DOCUMENTS

| | | | |
|---|---|---|---|
| 4,141,652 | 2/1979 | Feinleib | 256/121 |
| 4,326,800 | 4/1982 | Fitts | 250/201.9 |
| 4,724,404 | 2/1988 | Cochran | 359/849 |
| 5,287,165 | 2/1994 | Ulich et al. | 250/201.9 |

*Primary Examiner*—Ricky D. Shafer
*Assistant Examiner*—Audrey Chang
*Attorney, Agent, or Firm*—David G. Beck; Townsend and Townsend and Crew

[57] ABSTRACT

A new adaptive optics system and method of operation, whereby the method removes tilt control, and includes the steps of using a steering mirror to steer a wavefront in the desired direction, for aiming an impinging aberrated light beam in the direction of a deformable mirror. The deformable mirror has its surface deformed selectively by means of a plurality of actuators, and compensates, at least partially, for existing aberrations in the light beam. The light beam is split into an output beam and a sample beam, and the sample beam is sampled using a wavefront sensor. The sampled signals are converted into corresponding electrical signals for driving a controller, which, in turn, drives the deformable mirror in a feedback loop in response to the sampled signals, for compensating for aberrations in the wavefront. To this purpose, a displacement error (gradient) of the wavefront is measured, and adjusted by a modified gain matrix, which satisfies the following equation:

$$G' = (I - X(X^T X)^{-1} X^T) G(I-A)$$

4 Claims, 2 Drawing Sheets

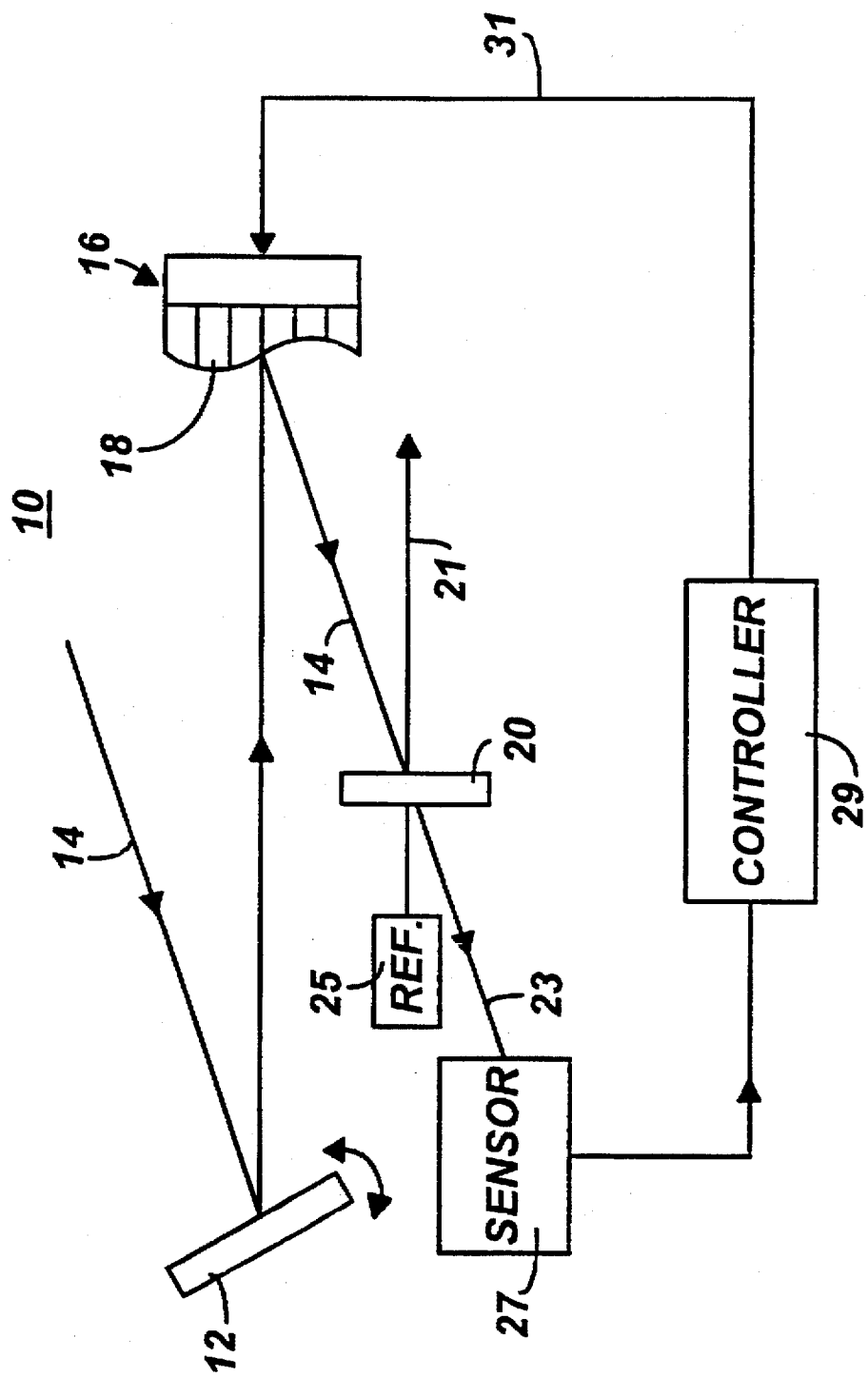
FIGURE 1

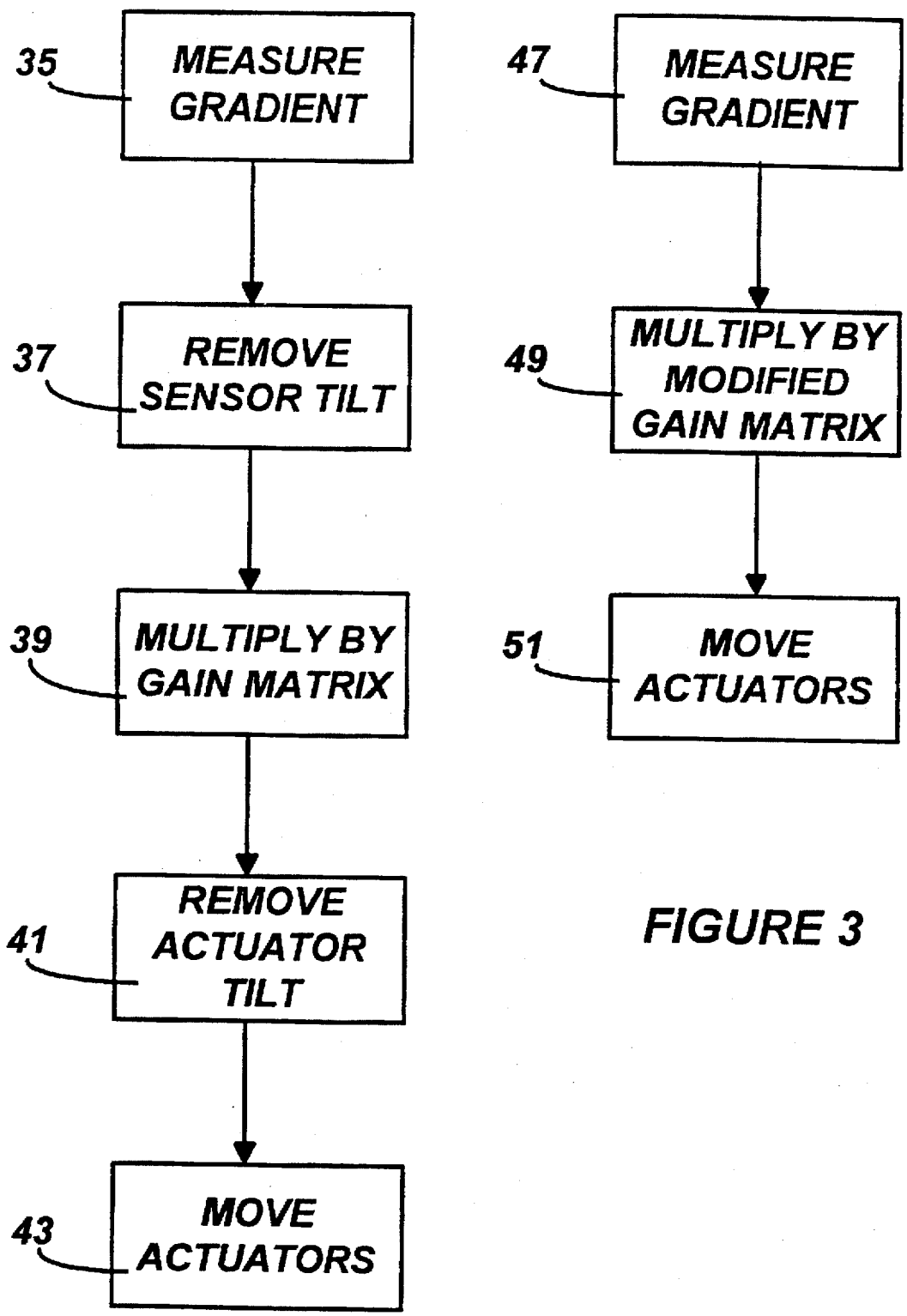
FIGURE 3
PRIOR ART
FIGURE 2

METHOD FOR REMOVING TILT CONTROL IN ADAPTIVE OPTICS SYSTEMS

This is a Continuation of application Ser. No. 08/516,505, filed Aug. 17, 1995, now abandoned which is a Continuation of application Ser. No. 08/258,892 filed Jun. 13, 1994, now abandoned.

STATEMENT OF GOVERNMENT RIGHTS

The United States Government has rights in this invention pursuant to Contract No. W-7405-ENG-48 between the United States Department of Energy and the University of California.

BACKGROUND OF THE INVENTION

1. Field of the Invention

The present invention relates in general to the field of optics, and more particularly to a new method for removing tilt control in adaptive optic systems.

2. Background Art

Adaptive optics technology is a scientific and engineering discipline whereby the fidelity of an optical signal is improved by using information about the environment in which it passes. The optical signal can be a laser beam or a light that eventually forms an image. The principles of adaptive optics are based on the premise that one can change the effects of an optical system by adding, removing, or altering optical elements.

For most optical systems, light waveforms can include aberrations that make the propagation of a beam of light or the image of some object different, thus degrading the image propagation process. It would therefore be desirable to eliminate such aberrations. As used herein, aberrations mean distortions of the wavefront from a flat or simple curvature condition.

A conventional adaptive optics system generally includes a deformable mirror, whose surface can be deformed selectively by means of actuators. The deformation of the mirror is typically within the range of several wavelengths of the impinging light. As the incoming aberrated light strikes the deformable mirror, it is reflected from the mirror, such that the mirror compensates, at least partially, for the aberrations.

The reflected light beam impinges upon a beam splitter or sampler that transmits a small fraction of the light, which is sampled by a wavefront sensor. The sampled signals are transmitted to a controller, which drives the actuators of the deformable mirror, in a feedback loop, in response to the sampled signals, for compensating for the aberrations in the light wavefront.

However, the wavefront can also be tilted and thus moves in the wrong direction. One attempt to correct tilt, which is another form of aberration, has conventionally been to include a steering mirror which continuously compensates for the tilt in the direction of the wavefront. In many adaptive optics systems it would not be desirable to compensate for the tilt, since the magnitude of the tilt might be much greater than the range of the deformable mirror, and consequently, the tilt cannot be removed.

Yet another reason for not removing the wavefront tilt, even if the tilt magnitude is within the range of the deformable mirror is that when the mirror moves away from its nominal position, where all the actuators are at the same displacement, the actuators will put a high-order stress on the mirror, causing undesirable and non-correctable ripples to form on its surface.

Current adaptive optics systems employ both a deformable mirror and a tilt mirror with each component having its own sensor. The actions of the two components are separated by removing any tilt component from the wavefront measurement used to drive the deformable mirror and form the actions of the actuators on the deformable mirror. Since the speed of the adaptive optics controller directly depends on the number of calculations required for each iteration, elimination of explicit calculations for removing tilt from both the wavefront measurement and the actuation of the deformable mirror would enhance the performance of the adaptive optics system.

SUMMARY OF THE INVENTION

It is therefore an object of this invention to cast the tilt calculations in a way that eliminates need to explicitly perform these calculations.

It is an object of the present invention to address the foregoing concerns in adaptive optics systems, and to provide adequate solutions thereto.

It is another object of the present invention to provide a new adaptive optics system with improved computational efficiency, and which eliminates the need to explicitly calculate tilt.

It is still another object of the present invention to provide a new adaptive optics system which enables tilt to become transparent, i.e., to be accounted for without explicitly calculating it.

It is yet another object of the present invention to provide a new method for enhancing the speed of adaptive optics systems, by significantly reducing the number of required computations.

Briefly, the foregoing and other objects are achieved by providing a new adaptive optics system and method of operation, whereby the method removes tilt control, and includes the steps of using a steering mirror to steer a wavefront in the desired direction, for aiming an impinging aberrated light beam in the direction of a deformable mirror. The deformable mirror has its surface deformed selectively by means of a plurality of actuators, and compensates, at least partially, for existing aberrations in the light beam. The light beam is split into an output beam and a sample beam, and the sample beam is sampled using a wavefront sensor. The sampled signals are converted into corresponding electrical signals for driving a controller, which, in turn, drives the deformable mirror in a feedback loop in response to the sampled signals, for compensating for aberrations in the wavefront.

To this purpose, a displacement error (gradient) of the wavefront is measured and adjusted by a modified gain matrix that implicitly removes the overall tilt from the measured gradient of the wavefront, and removes any tilt arising from errors in the gain matrix that normally would be imposed on the wavefront reflected by the deformable mirror. This removal of tilt is required of all adaptive optics systems that employ a separate tilt mirror and is found in the prior art. The measurement tilt is removed by first finding the x and y components of the average tilt vector as follows:

$$\bar{s}_x = \frac{1}{N} \sum_{i=1}^{N} s_{x,i}$$

and $$\bar{S}_y = \frac{1}{N} \sum_{i=1}^{N} S_{y,i}$$

where $S_{x,i}$ and $S_{y,i}$ are local tilt measurements parallel to the x-axis and y-axis by a single lenslet channel of a Hartmann sensor, and N is the number of lenslets. The average tilt is controlled by the steering mirror and, hence, must be removed from any adaptive optics system that uses a separate steering mirror for removing tilt.

A net displacement vector S' is then found, whose x and y components with the tilt removed are defined by:

$$S'_x = S_x - \bar{S}_x$$

and $$S'_y = S_y - \bar{S}_y.$$

Elimination of explicate calculation of average wavefront tilt is accomplished by recasting the tilt calculations in a way that enables the controller to fold them into the gain matrix ahead of time. This is not obvious, since one does not assume that something can be removed before it is calculated, which this method accomplishes. This method removes these explicit tilt calculations by recasting them in matrix form as follows:

$$S' = \begin{bmatrix} S'_x \\ S'_y \end{bmatrix} = \begin{bmatrix} S_{x,1} \\ S_{x,2} \\ \vdots \\ S_{x,N} \\ S_{y,1} \\ S_{y,2} \\ \vdots \\ S_{y,N} \end{bmatrix} - \frac{1}{N} \begin{bmatrix} 1 & 1 & \dots & 1 & 0 & 0 & \dots & 0 \\ 1 & 1 & \dots & 1 & 0 & 0 & \dots & 0 \\ \vdots & & & & & & & \vdots \\ 1 & 1 & \dots & 1 & 0 & 0 & \dots & 0 \\ 0 & 0 & \dots & 0 & 1 & 1 & \dots & 1 \\ 0 & 0 & \dots & 0 & 1 & 1 & \dots & 1 \\ \vdots & & & & & & & \vdots \\ 0 & 0 & \dots & 0 & 1 & 1 & \dots & 1 \end{bmatrix} \begin{bmatrix} S_{x,1} \\ S_{x,2} \\ \vdots \\ S_{x,N} \\ S_{y,1} \\ S_{y,2} \\ \vdots \\ S_{y,N} \end{bmatrix} = (I - A)S$$

where I is the identity matrix and AS is the average tilt in the Hartmann measurement. The matrix [I–A] has dimensions 2N×2N, where N is the number of lenslets in the Hartmann sensor, and is independent of the measurement itself. This independence from the measurement enables the controller to fold the wavefront tilt calculations into the gain matrix ahead of time. Even though wavefront tilt has been removed, errors in the gain matrix will lead to a net tilt component in the actuator movers on the deformed mirror commanded by the adaptive optics controller.

In present invention, the mirror tilt is removed by fitting a plane to the commanded moves by the actuators of the deformable mirror and subtracting that plane from those moves. The plane is usually fit to the moves with a linear least squares method. This plane is subtracted from the actuator moves to remove the tilt components from the actuator commands. To remove these explicit calculations from the controller, this method casts them in matrix form, which yields the net movement by the actuators is by:

$$z' = z - Xc = (I - X(X^T X)^{-1} X^T)z$$

where z is the initial actuator displacement vector (which has some tilt component), c is the coefficient vector of the planar fit to z, and X is a configuration matrix given by $$Xc = z$$

Note that $(I - X(X^T X)^{-1} X^T)$ is independent of z.

By folding in the matrix forms for the calculations removing tilt from both the wavefront measurement and the actuator commands, the gain matrix is modified in a way that eliminates the need to calculate and remove tilt every time the wavefront is measured or the deformable mirror actuators are moved.

The resulting modified gain matrix then becomes:

$$G' = (I - X(X^T X)^{-1} X^T) G (I - A),$$

where G is the initial gain matrix, which is the prior art. This modified gain matrix eliminates the need to explicitly calculate and remove waveform tilt and mirror tilt by the controller. Hence, the performance of the controller improves owing to the reduced number of calculations required in each iteration.

BRIEF DESCRIPTION OF THE DRAWINGS

The above and other features of the present invention and the manner of attaining them, will become apparent, and the invention itself will be best understood, by reference to the following description and the accompanying drawings, wherein:

FIG. 1 is a schematic view of an adaptive optics system which operates according to the present invention;

FIG. 2 is a high level block diagram illustrating the operation of a conventional adaptive optics system; and FIG. 3 is a high level block diagram illustrating the operation of the adaptive optics system shown in FIG. 1, according to the present invention.

DETAILED DESCRIPTION OF THE PREFERRED EMBODIMENT

Referring now to the drawings, and more particularly to FIG. 1 thereof, there is illustrated an adaptive optics system 10 which operates according to the present invention. The adaptive optics system 10 generally includes a steering mirror 12, which steers the light in the desired direction, for aiming an impinging aberrated light beam, such as a laser beam 14 in the direction of a deformable mirror 16. The deformable mirror 16 has its surface deformed selectively by means of a plurality of actuators 18.

When the aberrated light beam 14 strikes the deformable mirror 16, it is reflected from it, such that the mirror 16 compensates, at least partially, for the existing aberrations. The reflected light beam 14 impinges upon a splitter 20, which splits the light beam 14 into an output beam 21 and a sample beam 23. A wavefront reference source 25 provides a beam with a flat wavefront to calibrate a wavefront sensor 27.

The wavefront sensor 27 samples the sample beam 23, and converts the sample light into corresponding electrical signals, which are sent to controller 29. In turn, the controller 29 drives the deformable actuators 18 of the deformable mirror 16, in a feedback loop 31, in response to the sampled signals, for compensating for the aberrations in the light wavefront.

The controller 29 includes a central processing unit (CPU), not shown, which correlates the input electrical signals into corresponding control signals for deforming the actuators 18, in order to obtain a closed loop bandwidth, by operating the adaptive optics system 10 at about 20 times the needed closed-loop bandwidth. In such an adaptive optics system 10, any reduction in the number of computations in the controller 29 will proportionally reduce the required throughput in the CPU. Wherefore, the present invention includes the development of a method which minimizes the impact of removal of tilt and piston by the controller in the adaptive optics system 10, by reducing the number of steps in the control loop by a factor of two or more, and the number of floating point operations by at least 30%.

Since the adaptive optics system 10 in an optical transport system forms part of the alignment system, the adaptive optics system 10 must avoid perturbing the parameters used by the alignment system. Otherwise, the adaptive optics system 10 and the alignment system will compete with each other until one of the components of either system reaches a limit, which renders that system inoperable. Hence, the adaptive optics system 10 must be transparent to beam tilt, and also must not independently introduce any tilt to the beam.

The conventional process of controlling the adaptive optics system is generally illustrated, in a block diagram form, in FIG. 2. The gradient of the wavefront is measured (block 35) using the wavefront sensor 27, as follows: From each measurement of the centroids of the spots, with a Hartmann sensor, reference centroids are subtracted to yield a displacement error (gradient).

Thereafter, as illustrated by block 37, the sensor tilt is calculated and removed as follows, by subtracting an average displacement error or gradient from each measurement. The result is multiplied by a gain matrix (block 39), which relates actuator moves to displacement errors in the measurement. The gain matrix in the prior art is the pseudo-inverse of the response matrix, which is obtained by moving individual actuators and measuring the response with the wavefront sensor.

The actuator tilt is then calculated and removed, as illustrated by block 41. The result of the multiplication by the gain matrix (block 39) includes some residual tilt which is caused by hysteresis in the actuators and by other errors in measuring the response matrix. Consequently, the actuator tilt will need to be removed (block 41), generally by fitting a plane with a Least Squares method to the actuator moves vector, and by subtracting values of the planar fit from the moves vector. The residuals are then applied to the actuators for causing them to move (block 43), and the process is repeated.

Turning now to FIG. 3, it generally illustrates a high level block diagram of the operation method of the adaptive optics system 10 of FIG. 1, according to the present invention. The new method 45 differs from the conventional method in that it combines the three conventional operation steps illustrated by blocks 27, 39 and 41 into a single step, as illustrated by block 49, (a modified gain matrix, which has the same dimensions as the original gain matrix used in block 39), as it will explained later in greater detail.

The operation method generally includes the step of measuring the gradient of the wavefront (block 47), similarly to block 35. The gradient is then multiplied by a modified gain matrix (block 49) which will be defined later, and the result is used to move the actuators (block 51). The method saves operation time by reducing the number of required computational steps. Furthermore, the method will enable the bandwidth of existing adaptive optics system 10 to be increased, or, in the alternative, to have the same bandwidth with the controller using slower components, which translates into lower cost.

Unlike the conventional method which calculates and removes the tilt at two places (blocks 37 and 41), the novel step of multiplication with a modified gain matrix (block 49) is unique in that it is now possible to have no residual tilt without having to calculate it explicitly and to subtract it. The modified gain matrix is determined in the following manner.

The following modified gain matrix is determined in the following manner. The x and y components of the average tilt vector S in the wavefront are defined by Equations (1) and (2) below:

$$\bar{S}_y = \frac{1}{N} \sum_{i=1}^{N} S_{y,i}$$

$$\bar{S}_y = \frac{1}{N} \sum_{i=1}^{N} S_{y,i} \tag{2}$$

Since the total net displacement error vector can be represented by the concatenation of the x-component of the displacement vector and the y-component of the displacement vector, Equations (3) and (4) can be recast as:

$$S' = \begin{bmatrix} S'_x \\ S'_y \end{bmatrix} = \begin{bmatrix} S_{x,1} \\ S_{x,2} \\ \vdots \\ S_{x,N} \\ S_{y,1} \\ S_{y,2} \\ \vdots \\ S_{y,N} \end{bmatrix} -$$

$$\frac{1}{N} \begin{bmatrix} 1 & 1 & \cdots & 1 & 0 & 0 & \cdots & 0 \\ 1 & 1 & \cdots & 1 & 0 & 0 & \cdots & 0 \\ \vdots & & & & & & & \vdots \\ 1 & 1 & \cdots & 1 & 0 & 0 & \cdots & 0 \\ 0 & 0 & \cdots & 0 & 1 & 1 & \cdots & 1 \\ 0 & 0 & \cdots & 0 & 1 & 1 & \cdots & 1 \\ \vdots & & & & & & & \vdots \\ 0 & 0 & \cdots & 0 & 1 & 1 & \cdots & 1 \end{bmatrix} \begin{bmatrix} S_{x,1} \\ S_{x,2} \\ \vdots \\ S_{x,N} \\ S_{y,1} \\ S_{y,2} \\ \vdots \\ S_{y,N} \end{bmatrix} = (I-A)S$$

where $S_{x,i}$ and $S_{y,i}$ are local tilt measurements parallel to the x-axis and y-axis by a single lenslet channel of the Hartmann sensor, and N is the number of lenslets.

The net displacement vectors are found by subtracting the average tilt from the measured tilt in the wavefront sensor, yielding $$S'_x = S_x - \bar{S}_x \qquad (3)$$

$$S'_y = S_y - \bar{S}_y \qquad (4)$$

where I is the identity matrix and AS is the average tilt in the Hartmann measurement. The matrix [I–A] has dimensions 2N×2N, where N is the number of lenslets in the Hartmann sensor. Note that S is the measurement vector and (I–A) is independent of the measurement.

The output from the gain matrix multiplication is the set of actuation moves that would yield the measured wavefront error. Since the set of actuation moves has residual tilt, the removal of tilt and piston from the output of the gain matrix multiplication is required before actually driving the deformable mirror. The first step is where the controller applies a least-squares planar fit to the displacement error output vector z. The set of linear equations for a plane which is given by Equation (6) below:

$$Xc = z \qquad (6)$$

where:

$$X = \begin{bmatrix} 1 & [x_1 & y_1 \\ 1 & x_2 & y_2 \\ \cdot & \cdot & \cdot \\ \cdot & \cdot & \cdot \\ \cdot & \cdot & \cdot \\ 1 & x_N & y_N \end{bmatrix}$$

and $$c = \begin{bmatrix} c_0 \\ c_x \\ c_y \end{bmatrix}$$

Solving for c by linear least squares is equivalent to taking the pseudo-inverse of X and multiplying by z, as shown in the following Equation (9):

$$c = (X^T X)^{-1} X^T z \qquad (9)$$

Subtracting tilt and piston from z is shown in the following Equation (10):

$$c = (X^T X)^{-1} X^T z \qquad (10)$$

where z' is the net error in the actuator positions with the tilt removed, I is the identity matrix with dimensions of M×M, and M is the number of actuators.

The gain matrix integrates the measured displacements of the Hartmann spots and yields the displacement error z in the actuators, as defined by the following equation (11):

$$z = GS \qquad (11)$$

where G is the gain matrix. The controller 29 removes sensor tilt and actuator tilt, by applying Equation (5) on S, multiplying by G, and then applying Equation (10) to the result, which yields the following Equation (12):

$$z' = (I - X(X^T X)^{-1} X^T) G(I-A) S \qquad (12)$$

By comparing Equations (11) and (12), it is now possible to reduce the matrix operations into a modified gain matrix G', as indicated by the following Equation (13):

$$G' = (I - X(X^T X)^{-1} X^T) G(I-A) \qquad (13)$$

G' can be obtained at the time that G is determined, because X is only a function of the geometry of the deformable mirror and A depends only on the number of lenslets in the Hartmann sensor. Furthermore, the entire Least Squares method of removing tilt from the controller 29 is now embedded in the gain matrix itself. This procedure removes at least $M^2$ floating point multiplications from the control cycle, which numbers 3600 for a 60—actuator deformable mirror.

The operation G'S uses roughly M×2N floating point multiplications, which numbers about 8640 for the deformable mirror 16, and is about 70% of the number of procedure 45 used in the deployed adaptive optics systems 10.

The foregoing description of the invention has been presented for purposes of illustration and description. It is not intended to be exhaustive or to limit the invention to the precise forms described, and obviously many other modifications are possible in light of the above teaching. The embodiments were chosen in order to explain most clearly the principles of the invention and its practical applications, thereby to enable others in the art to utilize most effectively the invention in various other embodiments and with various other modifications as may be suited to the particular use contemplated.

What is claimed:

1. In an adaptive optics system of the type wherein a steering mirror steers an impinging wavefront toward a deformable mirror to impinge on said deformable mirror, said deformable mirror being of the type having its surface deformed selectively by means of a plurality of actuators to compensate for aberrations in said impinging wavefront, and wherein said compensated wavefront from said deformable mirror is sampled by a wavefront sensor array to measure the displacement error of the wavefront, and wherein said measured displacement error is coupled through a controller to control the actuators of the deformable mirror, an improved method of controlling the actuators which utilizes a single multiplication of the measured displacement error by a gain matrix, G', to remove tilt components of the measured displacement errors in controlling the actuators, which comprises:

a) adjusting the measured displacement errors to generate signals to control said actuators by multiplying the measured displacement errors by a gain matrix given by $$G' = (I - X(X^T X)^{-1} X^T) G(I-A)$$

wherein

I=a first matrix, said first matrix is an identity matrix with dimensions of M×M, and M is the number of said actuators, A=a second matrix, said second matrix multiplied by the measured displacement error yielding an average tilt for all elements of said wavefront sensor array, z=GS where z is the displacement error vector in the actuators, S is the measured displacement error vector of the wavefront sensor array, and G is an initial gain matrix;

X=is a configuration matrix given by Xc=z where c is the coefficient vector of the planar fit to read z; and $X^T$ is the transpose of X.

2. A method of controlling a deformable mirror, comprising the steps of:

steering an aberrated light beam towards said deformable mirror with a steering mirror, said steering mirror imparting a system tilt component to said aberrated light beam, wherein said deformable mirror has a deformable reflective surface controlled by a plurality, M, of actuators, measuring a displacement vector for a wavefront associated with said aberrated light beam using a wavefront sensor array;

multiplying said displacement vector with a first gain matrix G' to generate a modified displacement vector, wherein G' is defined as $(I-X(X^TX)^{-1}X^T)G(I-A)$, wherein I is a first matrix, said first matrix is an identity matrix of dimensions M×M, wherein X is a configuration matrix, wherein G is an initial gain matrix, wherein A is a second matrix, said second matrix multiplied by measured displacement vector yielding an average tilt for all elements of said wavefront sensor array, and $X^T$ is a transpose of X;

converting said modified displacement vector to a corresponding electrical signal; and applying said corresponding electrical signal to said plurality of actuators.

3. The method of claim 2, wherein said applying step causes said deformable mirror to substantially compensate for said aberrated light beam.

4. The method of claim 3, wherein said first gain matrix decouples control of said deformable mirror from control of said steering mirror.

* * * * *